Oct. 17, 1950

L. B. KENDALL 2,526,238

PIPE LINE CLOSURE

Filed Nov. 28, 1947

Leonard B. Kendall
INVENTOR.

BY
Clarence A. O'Brien
and Harvey B. Jacobson
Attorneys

UNITED STATES PATENT OFFICE 2,526,238

PIPE-LINE CLOSURE

Leonard B. Kendall, Berryville, Ark.

Application November 28, 1947, Serial No. 787,831

1 Claim. (Cl. 138—89)

The present invention relates to a closure for the open end of a pipe line, said closure being temporarily usable for limited time periods; for example, at the end of a work day, over a weekend or a similar holiday period.

It is common practice, when laying a pipe line, to "head in" and thus close the otherwise open end of the line when work is stopped at the end of the day or at any other time. Ordinarily, a plate is welded over the end and said plate has to be removed when work is resumed the next day. These precautionary closures are employed in line construction work to prevent the entrance of extraneous and foreign matter, to prevent children from throwing rocks and other articles into an open pipe, and also, to prevent small animals from entering and crawling into the line.

In carrying out the principles of the present invention I provide a simple and practical cap which fits removably over the pipe end to temporarily close same, said cap having a framework for harnessing and clamping same in place and said frame-work being provided with a clamping screw to accommodate a padlock and to prevent said screw from being released as long as the padlock is in place.

Other objects and advantages will become more readily apparent from the following description and the accompanying illustrative drawings.

In the drawings, wherein like numerals are employed to designate like parts throughout the views.

Figure 1:
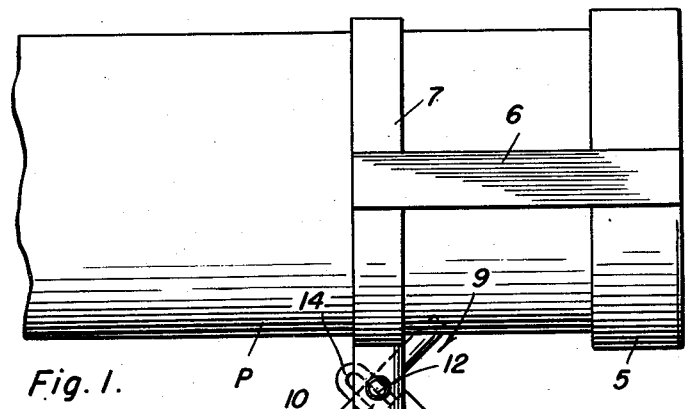
Figure 1 is a side elevational view of a fragmentary portion of a line pipe section, the same being provided with a closure constructed in accordance with the principles of the present invention.
Figure 2:
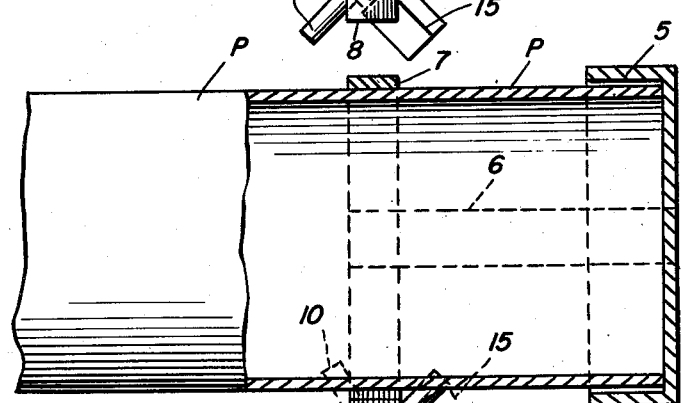
Figure 2 is a view partly in section and partly in elevation illustrating the details of construction seen in Figure 1.
Figure 3:
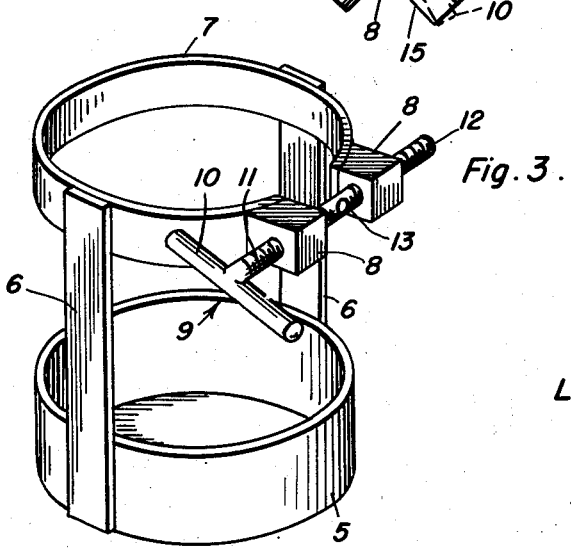
Figure 3 is a perspective view of the closure per se.

Reference is had first to Figure 3 which shows the specific details embodied in said closure. As here shown, the numeral 5 denotes a simple cap which is adapted to fit over the open end of the pipe P as shown in Figures 1 and 2. Also as shown in Figure 2 the rim of the cap need not necessarily fit tightly since said cap is primarily a temporary closure to prevent the entrance into the pipe-end of trash and the like. The cap is provided on diametrically opposite portions with a pair of rigidly welded or otherwise attached arms 6 which arms are in turn connected with a split clamping collar 7. The collar is adapted to tightly embrace the pipe and the free end portions are provided with outstanding rigidly attached lugs 8 which are apertured and threaded to function as nuts and to accommodate the screw-threaded portions of the clamping bolt 9. The bolt is of T-shaped form and the T-head, forming the handle, is denoted by the numeral 10. The shank portion has left hand screw-threads at 11 and right hand screw-threads at 12 which are threaded into the nut forming lugs. The intermediate portion of the shank, between the lugs is provided with a hole 13 which is adapted to accommodate the shackle 14 of an ordinary padlock 15. The padlock prevents turning of the threaded shank of the clamping bolt as shown in dotted lines in Figure 2 and thus once the collar is bolted or clamped in place and the padlock is applied, the cap remains securely in position, as is obvious.

The invention, as the disclosure reveals, has to do with a simple, practical and highly economical closing cap for an otherwise open end of a pipe line while the latter is under construction. The simple cap which "hoods over" the pipe end and the harness which bolts it in place provides, it is believed, a closure which is more satisfactorily usable than the present type where, at the end of the day, a plate is welded to close in the open line, said plate being subsequently removed by breaking it loose when the work day begins.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An attachment for the open end of a pipe line, said attachment constituting a closure and serving as a temporarily usable "head in" at the end of a work day and until work is subsequently resumed next day comprising a comparatively large cap with a marginal rim adapted to be fitted telescopically over the normally open end of a large gas main, sewer pipe or the like, a resilient split clamping collar adapted to removably surround said pipe, the free end portions of said collar being provided with outstanding nuts, a handle-equipped bolt having left hand and right hand screw threads threaded through correspondingly threaded openings in the respective nuts, a pair of diametrically opposite arms connected at corresponding ends to the rim of said cap on the one hand and at opposite corresponding ends to said collar, the portion of the bolt between said nuts being provided with a hole, and a padlock, the shackle of said padlock passing through said hole whereby the padlock is carried by the bolt and situated between the nuts and is adapted if bodily rotated through an orbital path to strike and jamb against the pipe section to prevent unauthorized rotation of said bolt.

LEONARD B. KENDALL.

REFERENCES CITED

The following references are of record in the file of this patent:

UNITED STATES PATENTS

| Number | Name | Date |
|---|---|---|
| 516,991 | Rusco | Mar. 20, 1894 |
| 1,240,340 | Honpeter | Sept. 18, 1917 |
| 1,701,940 | Alexander | Feb. 12, 1929 |
| 1,741,205 | Smith | Dec. 31, 1929 |
| 2,412,603 | Dauphinais | Dec. 17, 1946 |

FOREIGN PATENTS

| Number | Country | Date |
|---|---|---|
| 102,021 | Switzerland | Nov. 1, 1923 |
| 136,993 | Great Britain | Dec. 31, 1919 |